United States Patent
Singh et al.

(10) Patent No.: US 11,409,592 B2
(45) Date of Patent: Aug. 9, 2022

(54) METHODS OF PREDICTING ELECTRONIC COMPONENT FAILURES IN AN EARTH-BORING TOOL AND RELATED SYSTEMS AND APPARATUS

(71) Applicant: Baker Hughes Oilfield Operations LLC, Houston, TX (US)

(72) Inventors: Gulshan Singh, Hannover (DE); Thorsten Krueger, Niehagen (DE); Leandro J. Barbosa Lima, Rio de Janeiro (BR)

(73) Assignee: Baker Hughes Oilfield Operations LLC, Houston, TX (US)

( * ) Notice: Subject to any disclaimer, the term of this patent is extended or adjusted under 35 U.S.C. 154(b) by 98 days.

(21) Appl. No.: 16/789,855

(22) Filed: Feb. 13, 2020

(65) Prior Publication Data
US 2021/0255913 A1  Aug. 19, 2021

(51) Int. Cl.
*G06F 11/07* (2006.01)
*G06N 20/00* (2019.01)
*G05B 15/02* (2006.01)

(52) U.S. Cl.
CPC ............ *G06F 11/079* (2013.01); *G05B 15/02* (2013.01); *G06F 11/076* (2013.01); *G06F 11/0736* (2013.01); *G06N 20/00* (2019.01)

(58) Field of Classification Search
CPC .. G06F 11/079; G06F 11/0736; G06F 11/076; G06N 20/00; G05B 15/02
See application file for complete search history.

(56) References Cited

U.S. PATENT DOCUMENTS

| | | | |
|---|---|---|---|
| 6,732,052 B2 | 5/2004 | Macdonald et al. | |
| 6,973,613 B2 | 12/2005 | Cypher | |
| 7,286,959 B2 | 10/2007 | Steinke | |
| 7,979,240 B2 | 7/2011 | Fielder | |
| 8,204,697 B2 | 6/2012 | Garvey et al. | |
| 8,285,531 B2 | 10/2012 | Moran et al. | |
| 8,417,495 B2 | 4/2013 | Dashevskiy | |
| 8,453,764 B2 | 6/2013 | Turner et al. | |
| 9,024,778 B2 | 5/2015 | Winkler et al. | |
| 9,246,753 B2 * | 1/2016 | Hayashitani | H04L 41/0668 |
| 9,410,546 B2 | 8/2016 | Jaeger et al. | |
| 9,641,811 B2 | 5/2017 | Jose et al. | |
| 9,739,143 B2 | 8/2017 | Song et al. | |
| 9,784,099 B2 | 10/2017 | Kale et al. | |

(Continued)

OTHER PUBLICATIONS

Deb et al., AESOP: Automatic Policy Learning for Predicting and Mitigating Network Service Impairments, KDD '17: Proceedings of the 23rd ACM SIGKDD International Conference on Knowledge Discovery and Data Mining, (Aug. 2017), pp. 1783-1792, https://doi.org/10.1145/3097983.3098157.

*Primary Examiner* — Jonathan D Gibson
(74) *Attorney, Agent, or Firm* — TraskBritt

(57) ABSTRACT

A method or system for predicting failures in an earth-boring tool. Communication between one or more nodes in the earth-boring tool may be monitored. Metadata from the communication may be stored in a storage device. The metadata may be compared to historical communication metadata. The metadata may be fed into models built from historic metadata. Predictions from the models may be aggregated in to a recommendation. A failure prediction for each of the one or more nodes may be generated from the comparison.

20 Claims, 6 Drawing Sheets

(56) References Cited

U.S. PATENT DOCUMENTS

| | | |
|---|---|---|
| 9,857,271 B2 | 1/2018 | Dashevskiy et al. |
| 9,945,228 B2 | 4/2018 | Mancini |
| 9,957,780 B2 | 5/2018 | Knecht et al. |
| 10,338,993 B1* | 7/2019 | Lekivetz ............. G06F 11/0709 |
| 11,047,215 B2* | 6/2021 | Spencer ................. E21B 49/00 |
| 2003/0036882 A1* | 2/2003 | Harper ............... G06F 11/2035 |
| | | 702/186 |
| 2007/0272442 A1* | 11/2007 | Pastusek ............. E21B 47/017 |
| | | 175/40 |
| 2014/0010070 A1* | 1/2014 | Hayashitani ......... H04B 17/309 |
| | | 370/221 |
| 2015/0345262 A1 | 12/2015 | Kpetehoto et al. |
| 2016/0208794 A1 | 7/2016 | Singh et al. |
| 2017/0059637 A1* | 3/2017 | Santoso .................. H02H 3/08 |
| 2017/0090457 A1 | 3/2017 | Pandurangan et al. |
| 2017/0226842 A1* | 8/2017 | Omont ................ E21B 43/247 |
| 2018/0006915 A1* | 1/2018 | Kim ........................ H04L 43/08 |
| 2020/0110655 A1* | 4/2020 | Harwood ............. G06F 11/004 |
| 2021/0144068 A1* | 5/2021 | Mo ..................... H04L 41/0654 |

* cited by examiner

METHODS OF PREDICTING ELECTRONIC COMPONENT FAILURES IN AN EARTH-BORING TOOL AND RELATED SYSTEMS AND APPARATUS

TECHNICAL FIELD

Embodiments of the present disclosure generally relate to earth-boring operations. In particular, embodiments of the present disclosure relate to methods of predicting failures of electronic components in an earth-boring tool.

BACKGROUND

Various tools are used in hydrocarbon exploration and production to measure properties of geologic formations during or shortly after the excavation of a borehole. The tools often include various electronic devices such as sensors, controllers, communication devices, etc. Many of the electronic devices are located on a bottom hole assembly (BHA) that operates on a distal end of a drill string. The BHA often includes one or more earth-boring tools, such as drill bits, and reamers, a motor (e.g., mud motor), and other components such as steering devices, etc. The BHA also frequently includes measurement-while-drilling (MWD) and/or logging-while-drilling (LWD) modules, which include electronic components. The BHA often operates in harsh environments having high temperatures, high pressures, and significant amounts of vibration.

Failures of the electronic devices within the various components of the BHA may require extracting the BHA from the wellbore to replace the electronic components. Extracting the BHA from the wellbore may result in a loss of multiple days of productive work. In some operations, electronic devices may be replaced before they fail in an effort to avoid extracting the BHA to replace a failed component. Current methods of determining which electronic device to replace depend largely on length of service and/or signal accuracy, such as the accuracy of sensors or control signals from the electronic devices.

BRIEF SUMMARY

Some embodiments of the present disclosure may include a method of predicting failures in an earth-boring tool. The method may include monitoring, using a processor, communication between one or more nodes in the earth-boring tool. The method may further include providing metadata from the communication, wherein the metadata comprises data indicating communication quality. The method may further include generating one or more models from historical communication metadata. The method may also include generating a failure prediction for each of the one or more nodes based on the one or more models and the metadata from the communication.

Further embodiments of the present disclosure may include a non-transitory computer-readable storage medium. The non-transitory computer-readable storage medium may include instructions that when executed by a processor, cause the processor to receive communication metadata from one or more nodes of an earth-boring tool, wherein the communication metadata comprises data indicating communication quality. The instructions may also cause the processor to generate a failure prediction for one or more nodes of the earth-boring tool using the communication metadata and one or more models generated from historical communication metadata.

Another embodiment of the present disclosure may include a system for generating a health estimate of an earth-boring tool. The system may include a drill string comprising at least one earth-boring tool. The earth-boring tool may include at least one electronic device including at least two nodes and a communication line. The system may include a health estimation system that may include a processor and at least one non-transitory computer-readable storage medium storing instructions. The instructions may include a model generated from historical communication metadata. The instructions, when executed by the processor, may cause the health estimation system to monitor communication metadata from the communication line; wherein the communication metadata comprises data indicating communication quality between the at least two nodes. The instructions may also cause the health estimation system to generate a failure prediction for the at least one electronic device using the model.

BRIEF DESCRIPTION OF THE DRAWINGS

While the specification concludes with claims particularly pointing out and distinctly claiming embodiments of the present disclosure, the advantages of embodiments of the disclosure may be more readily ascertained from the following description of embodiments of the disclosure when read in conjunction with the accompanying drawings in which:

DETAILED DESCRIPTION

Figure 1:
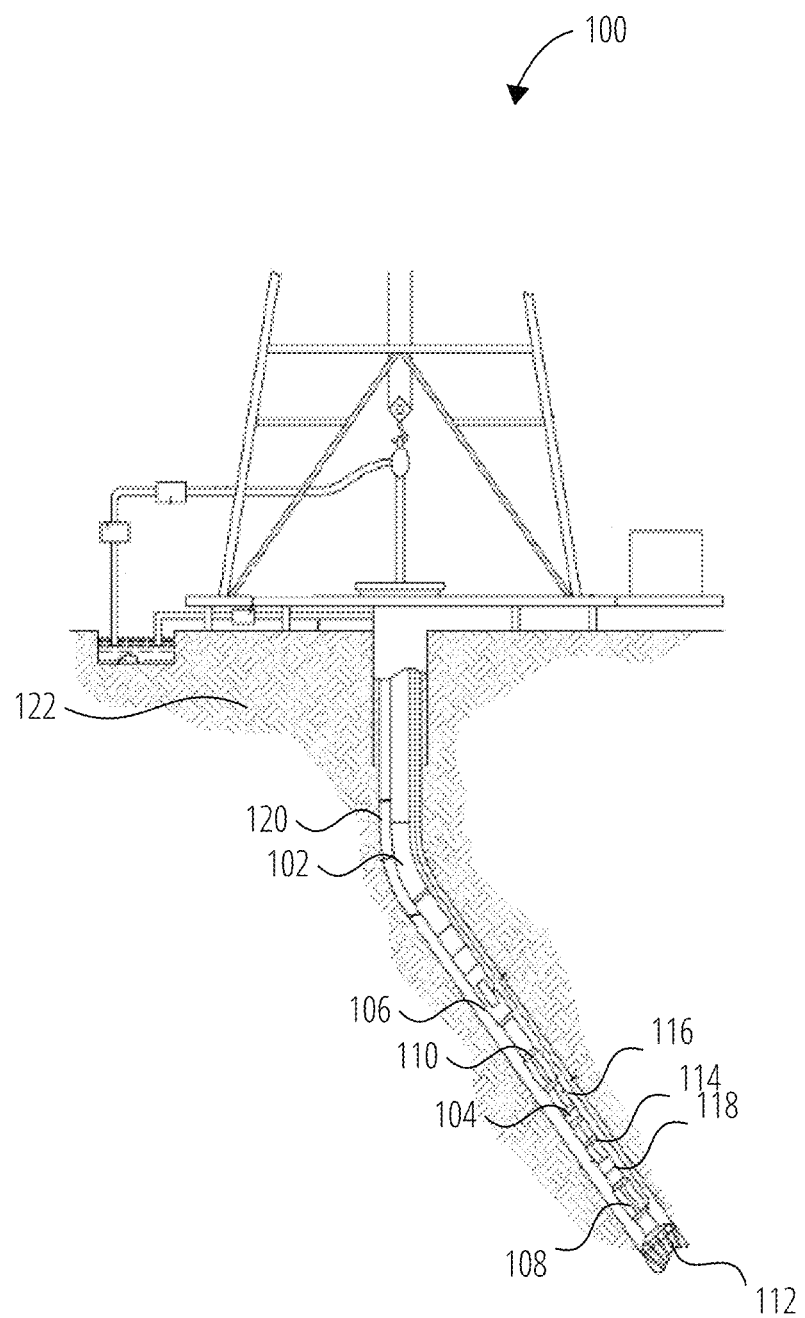
FIG. 1 illustrates a diagrammatic view an earth-boring system in accordance with an embodiment of the present disclosure.

The illustrations presented herein are not meant to be actual views of any particular earth-boring system or component thereof, but are merely idealized representations employed to describe illustrative embodiments. The drawings are not necessarily to scale.

As used herein, the term "substantially" in reference to a given parameter means and includes to a degree that one skilled in the art would understand that the given parameter, property, or condition is met with a small degree of variance, such as within acceptable manufacturing tolerances. For example, a parameter that is substantially met may be at least about 90% met, at least about 95% met, at least about 99% met, or even at least about 100% met.

As used herein, relational terms, such as "first," "second," "top," "bottom," etc., are generally used for clarity and convenience in understanding the disclosure and accompanying drawings and do not connote or depend on any specific preference, orientation, or order, except where the context clearly indicates otherwise.

As used herein, the term "and/or" means and includes any and all combinations of one or more of the associated listed items.

As used herein, the terms communication data, metadata and communication metadata mean and include all data relating to communication between one or more connected nodes. The data may include data indicating communication quality, such as communication successes, communication failures, total device failures, ping successes, ping failures, device health transmissions, communication acceptance, communication rejections, communication packet data (e.g., packet size, packet quantity, packet deliveries, packet returns, packet rejections, packet delivery failures, etc.), system communication data, mission successes, mission failures, etc.

As used herein, the term nodes means and includes an electronic member that can communicate, which may include individual communication interfaces of an electronic member. The electronic member may be in two electronic devices or different electronic boards (PCBA, Multi Chip Module, etc.) or may be in only one electronic device or in only one electronic board (PCBA, MCM, etc.). Two nodes may be connected by an electrically conductive line, or an optical line, or a wireless connection. Two nodes may be located in one earth-boring tool or in two different earth-boring tools in a drill string, wherein two earth-boring tools are connected by using a downhole tool connection. For example, an earth boring tool or a bottom hole assembly (BHA) includes many subsystems, such as mechanical, electronics and hydraulic. These subsystems work together to successfully complete the intended mission. The electronics systems may include devices such as processors, master processors, masters, local masters, slave processors, memory devices, sensors, and/or transducers. Each subsystem and/or system may further include firmware and a set of rules established for these devices to communicate through different communication interfaces and/or electronic members.

As used herein, the term failure means and includes an inability for the associated device to perform the intended functions. For example, BHA failure is defined as its inability to perform intended mission as per set expectations. A communication failure between two nodes is inability of nodes to communicate target data at expected frequency. A failure of a node may be a failure of an electronic member that is represented by the node. A failure of an electronic member may be a failure in an electronic component (such as a capacitor, inductor, or resistor, or integrated circuit), or it may be a failure in a connection between electronic components (such as a wire, a printed circuit board track, an optical connection, or a wireless connection or a connector).

FIG. 1 illustrates an earth-boring system 100. An earth-boring system 100 may include a drill string 102. The drill string 102 may include multiple sections of drill pipe coupled together to form a long string of drill pipe. A forward end of the drill string 102 may include a bottom hole assembly 104 (BHA). The BHA 104 may include components, such as a motor 106 (e.g., mud motor), one or more reamers 108 and/or stabilizers 110, and an earth-boring tool 112 such as a drill bit. The BHA 104 may also include electronics, such as sensors 114, modules 116, and/or tool control components 118. The drill string 102 may be inserted into a borehole 120. The borehole 120 may be formed by the earth-boring tool 112 as the drill string 102 proceeds through a formation 122. The tool control components 118 may be configured to control an operational aspect of the earth-boring tool 112. For example, the tool control components 118 may include a steering component configured to change an angle of the earth-boring tool 112 with respect to the drill string 102 changing a direction of advancement of the drill string 102. The tool control components 118 may be configured to receive instructions from an operator at the surface and perform actions based on the instructions. In some embodiments, control instructions may be derived downhole within the tool control components 118, such as in a closed loop system, etc.

The sensors 114 may be configured to collect information regarding the downhole conditions such as temperature, pressure, vibration, fluid density, fluid viscosity, cutting density, cutting size, cutting concentration, etc. In some embodiments, the sensors 114 may be configured to collect information regarding the formation, such as formation composition, formation density, formation geometry, etc. In some embodiments, the sensors 114 may be configured to collect information regarding the earth-boring tool 112, such as tool temperature, cutter temperature, cutter wear, weight on bit (WOB), torque on bit (TOB), string rotational speed (RPM), drilling fluid pressure at the earth-boring tool 112, fluid flow rate at the earth-boring tool 112, etc.

The information collected by the sensors 114 may be processed, stored, and/or transmitted by the modules 116. For example, the modules 116 may receive the information from the sensors 114 in the form of raw data, such as a voltage (e.g., 0-10 VDC, 0-5 VDC, etc.), an amperage (e.g., 0-20 mA, 4-20 mA, etc.), or a resistance (e.g., resistance temperature detector (RTD), thermistor, etc.). The module 116 may process raw sensor data and transmit the data to the surface on a communication line (e.g., communication bus, communication channel, communication network, etc.). For example, the module 116 may use a communication network protocol to transmit the raw sensor data. The communication network may include, for example a communication line, mud pulse telemetry, electromagnetic telemetry, wired pipe, etc. In some embodiments, the modules 116 may be configured to run calculations with the raw sensor data, for example, calculating a viscosity of the drilling fluid using the sensor measurements such as temperatures, pressures or calculating a rate of penetration of the earth-boring tool 112 using sensor measurements such as cutting concentration, cutting density, WOB, formation density, etc. In some embodiments, the communication line may be configured to transmit power between the modules 116 along with data.

In some embodiments, the downhole information may be transmitted to the operator at the surface or to a computing device at the surface. For example, the downhole information may be provided to the operator through a display, a printout, etc. In some embodiments, the downhole information may be transmitted to a computing device that may process the information and provide the information to the operator in different formats useful to the operator. For example, measurements that are out of range may be provided in the form of alerts, warning lights, alarms, etc., some information may be provided live in the form of a display, spreadsheet, etc., whereas other information that may not be useful until further calculations are performed may be processed and the result of the calculation may be provided in the display, print out, spreadsheet, etc.

Each component of the drill string 102 may include one or more modules 116 configured to process data, such as sensor data or control instructions, produce data, such as control instructions, store data, such as sensor data, and communicate data, such as sensor data or control instructions. The one or more modules 116 may communicate with other modules 116 over a communication line. The modules 116 may be subjected to high temperatures, high pressures, vibration, moisture, and other environmental hazards that may cause failures in electronic devices. Some modules 116 may perform critical processes, such that a failure of the module 116 may require that the drill string 102 be extracted (e.g., tripped out) to replace the module 116 before the operation can continue. For example, some modules 116 may control tool control components 118 such as steering components or speed control. In some embodiments, the modules 116 may transmit critical information to an operator at the surface.

Changing the modules 116 before a failure occurs may result in significant time and financial savings for a drilling operation. However, unnecessarily changing the modules 116 may also represent a large expense. Therefore, predicting when the specific modules 116 are not expected to survive until the next extraction of the drill string 102 may enable an operator to selectively replace the modules 116 before their failure requires the drill string 102 to be extracted.

Failures of the modules 116 may be separated into three distinct types of failure. The first type of failures are end of life failures. End of life failures may be predicted from historical data over its lifetime. For example, the historical life expectancy data associated with a particular module in a particular environment may predict an average life expectancy. Modules 116 that fail at or after the average life expectancy may be considered to reach an end of life failure. Generally most module 116 failures are end of life failures. The next largest percentage of failures are early failures. Early failures may be module failures that occur early in the life cycle of the modules 116. Early failures may result from design defects, manufacturing defects, a particularly hazardous environment, etc. The smallest number of failures are known as random failures. These failures occur in the middle of the life cycle of the modules 116. After early failures of modules 116 with defects, the modules that fail before the average life expectancy are considered random failures. Random failures may result from damage, such as shipping damage, moisture damage, vibration damage, damage caused during maintenance, etc., that may result in weaker portions of the modules 116 or loose connections. While end of life failures may be predicted and/or prevented using historical life expectancy data, predicting early failures and random failures may require additional considerations.

In some embodiments, there may be a pair of connected nodes that are part of the communication system of a BHA. These two nodes may be expected to communicate as part of the desired mission. For example, a node (i.e., a slave node) may be ready to send data to another node (i.e., a local master). The slave sends a specific command to the local master to indicate that it is ready to send data. There may be three possible responses from the local master (1) the local master indicates that it is ready to receive data (2) the local master indicates that it is not ready to receive the data or (3) there is no response from the local master. The response of the master may be stored on the slave memory (e.g., event log). In some embodiments, the response may be stored as a binary number. For example, 1 may indicate that the local master is ready to receive the data, 0 may indicate that the local master is not ready to receive the data packet, and NR may indicate that no response was received.

The above scenario may be completed in reverse where local master sends a command to the slave that it is ready to receive data. The slave node also may have the same three response options. The next set of events may be store in a memory of the local master as a 1, 0 or NR as described above. This event log of 1, 0, or NR over a mission may be defined as metadata. At the end of a mission, the metadata may be collected and/or analyzed for a pair of connected nodes.

For example, there may be a temperature sensor (slave node) and a master node that collects and transmits temperature data for further processing elsewhere (e.g., to a processor, uphole, to the surface, or to a remote location). Once a certain amount (e.g., as defined by a set of predefined rules) of temperature data is collected, the temperature sensor may send a signal to the master that it is ready to send temperature data. The master node may have the three options discussed above. Similarly, when the master node is ready to receive the temperature data, the master node may send a signal to the temperature sensor for temperature data. The temperature sensor may have the same three options. These responses from the nodes may be stored as metadata.

In some embodiments, the metadata may be stored by a master node, module, or computing device that may be located downhole, uphole, on the surface, or at remote operations location. In some embodiments, the metadata may be stored in a specially design apparatus/storage device for metadata. Metadata cleansing, aggregation, processing, model building, re-run predictions can also be performed by a master node, module, computing device, or specially designed apparatus/storage for meta data that may be located downhole, uphole, on the surface, or at remote operations location.

Figure 2:
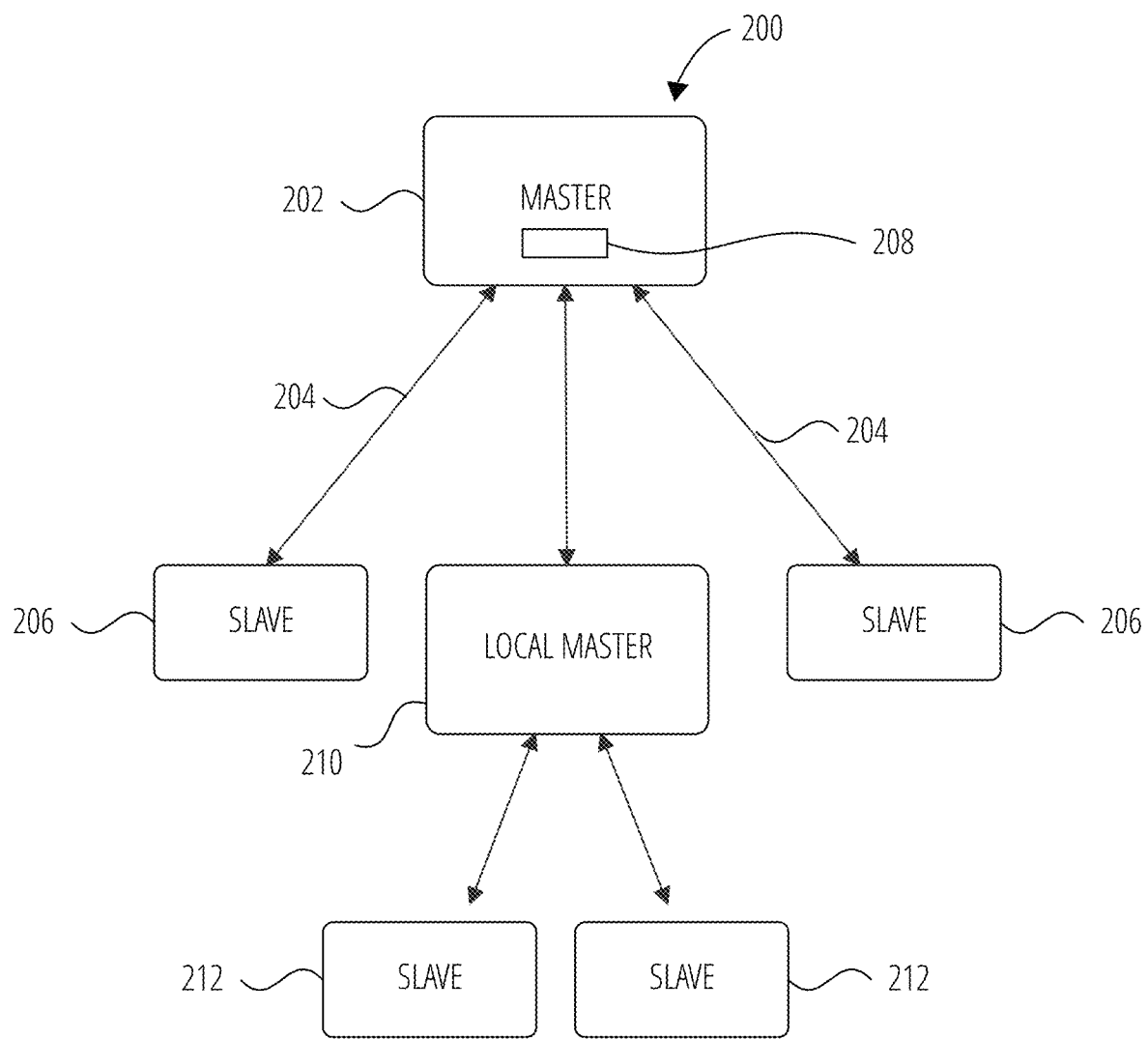
FIG. 2 illustrates a system diagram of a module in accordance with an embodiment of the present disclosure.

FIG. 2 illustrates a system diagram of a module 200. Each module 200 may include multiple nodes 202, 206. The nodes 202, 206 may perform different functions. For example, a master node 202 may control communication 204 to the slave nodes 206. The slave nodes 206 may each perform different functions from one another. For example, one of the slave nodes 206 may receive sensor data from a temperature sensor and another of the slave nodes 206 may receive sensor data from a pressure, speed, vibration, position, or direction sensor. In some embodiments, one or more of the slave nodes 206 may process the sensor data from one or more of the other slave nodes 206 and generate a control instruction. The master node 202 may control the communication 204 between the slave nodes 206 such that communication 204 from one of the slave nodes 206 to another of the slave nodes 206 must pass through the master node 202.

The communication 204 between the master node 202 and each of the slave nodes 206 may be monitored. For example, the master node 202 may send a request to open communication 204 with a first node of the slave nodes 206. The first node may grant the request, deny the request, or may not respond at all. In some embodiments, the grant, denial, or lack of response to the request may be monitored. In some embodiments, the master node 202 may monitor the request to determine if the request was received, failed, or there was no response. In some embodiments, the master node 202 may monitor the request to determine if the request was delivered or if the delivery failed. Similarly, each of the slave nodes 206 may send requests to open communication 204 with the master node 202. In some embodiments, the slave nodes 206 may monitor the request to determine if the requests was granted, denied, or no response was received, received or if the receipt failed, or delivered or if the delivery failed.

In some embodiments, the master node 202 may include a memory device 208 configured to store metadata related to the monitored communication, such as request grants, request denials, requests received, requests where the receipt failed, requests that were delivered, requests where the delivery failed, etc. The communication metadata may be tied to each respective master node 202 or slave nodes 206. In some embodiments, the master node 202 may process the communication metadata. In some embodiments, the master node 202 may generate ratios of the respective successes and failures along with mission success and failures. For example, the master node 202 may generate a ratio for each of the master node 202 and slave nodes 206 of the requests granted to the requests that are denied. In some embodiments, the master node 202 may generate a receipt ratio for each of the master node 202 and slave nodes 206 of the requests received to the requests where the receipt failed. In some embodiments, the master node 202 may generate a delivery ratio for each of the master node 202 and slave nodes 206 of the requests delivered to the requests where delivery failed.

In some embodiments, the master node 202 may communicate with one or more local master nodes 210. The local master nodes 210 may also communicate with local slave nodes 212. In some embodiments, the local master nodes 210 may monitor and store local communication metadata for communication between the local master node 210 and the local slave nodes 212. In some embodiments, the local master node 210 may transmit the local communication metadata to the master node 202 for storage. In some embodiments, the master node 202 may monitor and store the communication metadata at the local and system level.

An increase in the number of failed communication deliveries and/or failed communication receipts may indicate that the associated master node 202 and/or slave nodes 206 may fail. For example, failures that may be indicated by the failed communication deliveries and/or failed communication receipts may include loose connections, broken or breaking connections, delaminations, damaged boards, etc. Many of these failures may be associated with early failures and random failures that are difficult to predict using solely historical life expectancy data.

In some embodiments, the master node 202 may store the communication metadata for processing by another device, module, processor, etc. In some embodiments, the master node 202 may transmit the communication metadata to another module. In some embodiments, each of the master node 202 and slave nodes 206 may include a memory device 208 configured to store the communication metadata for each respective master node 202 and slave nodes 206. In some embodiments, the communication metadata may be processed and evaluated at a system level for the entire drill string 102 (FIG. 1).

In some embodiments, the module 200 may be a Rotary Steerable System (RSS) or steering device or communication master in a directional tool, and the respective master node 202, slave nodes 206, local master node 210, and local slave nodes 212 may be components within the RSS, steering device, or directional tool. In some embodiments, one or more of the local master node 210, slave node 206, or local slave node 212 may be a RSS, steering device or directional tool. In some embodiments, one or more of the module 200, the local master node 210, slave node 206, or local slave node 212 may be a Gamma or resistivity-measuring device or surface communication or power generation device in a BHA or earth boring apparatus. In some embodiments, one or more of the module 200, master node 202, slave node 206, local master node 210 and local slave node 212 may be a measurement-while-drilling (MWD) device configured to collect data, store data, process data, broadcast data, communicate data, configure data and/or manage data.

Figure 3:
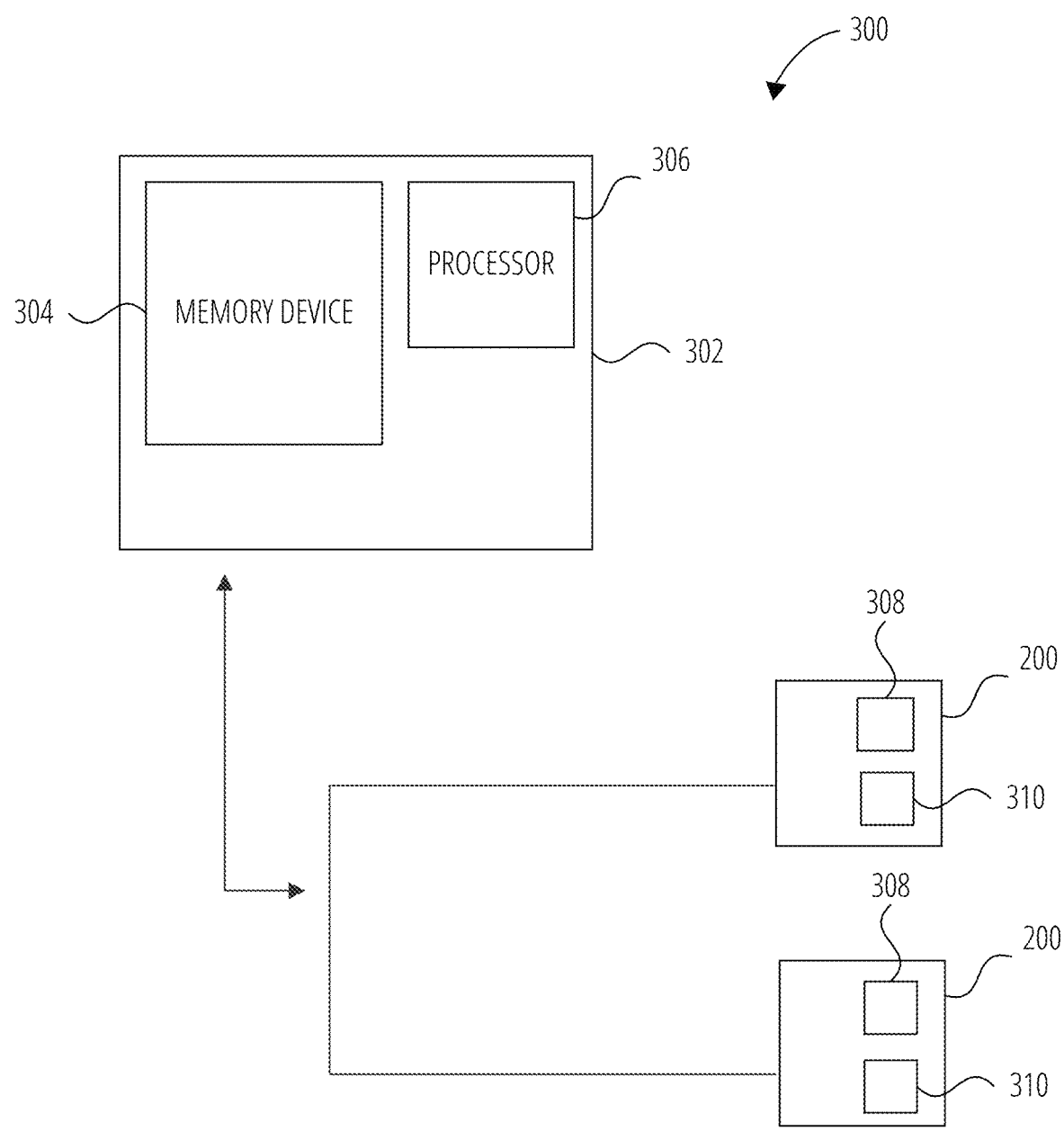
FIG. 3 illustrates a system diagram of an earth-boring tool system in accordance with an embodiment of the present disclosure.

FIG. 3 illustrates an electronics system 300 of an earth-boring tool, in which the system 300 includes multiple modules 200. The modules 200 may be associated with different downhole tools. In some embodiments, the different downhole tools may include multiple modules 200. As described above, each module 200 may include multiple nodes. A health estimation system 302 may communicate with each module 200. The health estimation system 302 may be a computing device, such as a personal computer, tablet, server, laptop, control board, etc.

In some embodiments, the health estimation system 302 may be configured to connect to each module 200 individually (e.g., a direct connection). In some embodiments, the health estimation system 302 may be configured to communicate with each module 200 over a communication line, such as a wired connection network connection or a wireless connection network connection or remote connection. In some embodiments, the health estimation system 302, may only connect to the modules 200 when the associated downhole tools are tripped out of the wellbore. In some embodiments, the health estimation system 302, may be continually connected to the modules 200 even when the associated downhole tools are actively engaging the formation. In some embodiments, data stored in the modules may be transferred to the health estimation system 302 through a separate device, such as a memory device, memory card, thumb drive, external hard drive, etc. In some embodiments, the health estimation system 302 may be located at a remote location, such as an operation headquarters, corporate headquarters, cloud server, engineering office, etc. The health estimation system 302 may communicate with the modules 200 through an internet connection or the separate device described above may be used to transport the information from the modules 200 to the remote location to be accessed by the health estimation system 302.

The health estimation system 302 may include a memory device 304 and a processor 306. The memory device 304 may include historical communication metadata, instructions, programs, rules, etc., used to evaluate the communication metadata from each module 200. The historical communication metadata may include communication metadata collected from modules on previous drill strings along with failure statistics of the respective modules. For example, the historical communication metadata may be collected from previous nodes in modules on the previous drill strings used to drill previous wellbores, such as different offset wells. The historical communication metadata may be collected from multiple different previous drill strings and/or multiple different previous nodes on each of the multiple different previous drill stings. The failure statistics may include a length of service before failure for each set of communication metadata and/or whether the associated node failed during the next drilling operation (e.g., before the drill string was extracted again).

The historical communication metadata may include data relating to the type of drill string, downhole environment properties (e.g., environmental properties, drilling mud properties, downhole temperature, downhole pressure, borehole depth), formation properties (e.g., lithology, density, resistivity, porosity, formation fluid type (oil, gas, water), etc.), tool properties (e.g., tool material, tool operational limits (bending moment limit, vibration (acceleration) limit, temperature limit, weight-on-bit limit, rotary speed limit (RPM) circulation hour limit), tool shape, tool components, type of downhole tool, etc.), etc., to account for environmental factors that may affect the communication between nodes. For example, some environments may experience higher ratios of failed communication deliveries or failed communication receipts in normal operation. For example, large amounts of electrical noise in a particular type of downhole tool may result in communication interference that causes a higher rate of failed communication deliveries or failed communication receipts between otherwise healthy nodes.

Each module 200 may include a memory storage device 308 and a microprocessor 310. The memory storage device 308 may be configured to store the communication metadata for each module 200. In some embodiments, the memory storage device 308 may store the communication metadata for each node in the module 200. In some embodiments, the memory storage device 308 may be the memory device 208 in the master node 202 of the module 200. In some embodiments, the memory storage device 308 may be a separate memory storage device 308 configured to store the communication metadata for all nodes in the module 200. For example, a module 200 may include more than one master node 202 and associated slave nodes 206. In some embodiments, the module 200 may include a main master node 202 with multiple sub-master nodes and associated slave nodes 206.

The microprocessor 310 may control the storage and communication of the communication metadata in each module. For example, the microprocessor 310 may monitor the memory storage device 308 and transmit the communication metadata to a master node 202 when the amount of communication metadata stored in the memory storage device 308 reaches a threshold level. In some embodiments, the microprocessor 310 may identify and/or flag communication metadata indicating a communication failure.

The processor 306 may receive the communication metadata from the memory storage device 308 in each module 200 and compare the communication metadata to the historical communication metadata in the memory device 304. The processor 306 may then generate a failure prediction for each link of communication 204 within and/or between each module 200. In some embodiments, the processor 306 may generate a failure prediction for each pair of nodes of each module 200. In some embodiments, the processor 306 may provide multiple different failure predictions (e.g., a plurality of failure predictions), as described in further detail below.

Figure 4:
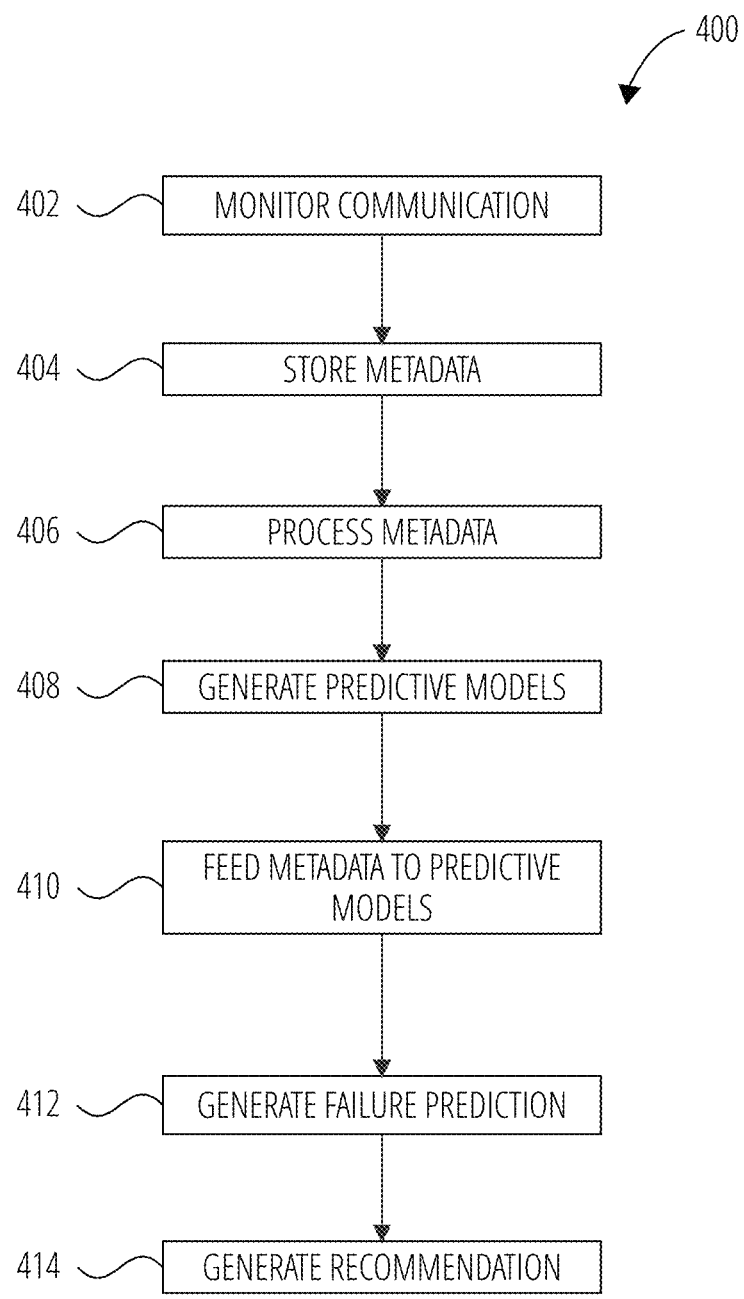
FIG. 4 illustrates a flow chart representative of a method of predicting a failure of a component in accordance with an embodiment of the present disclosure.

FIG. 4 illustrates a failure prediction method 400. Referring also to FIG. 3 for components of the earth-boring tool system 300. Each module 200 may monitor communication between the nodes in the module 200, as illustrated in action 402. In some embodiments, action 402 may further include monitoring communication between each module 200 and the health estimation system 302. In some embodiments, a drill string 102 (FIG. 1) may include a communication line connecting the separate modules 200 such that the separate modules 200 may communicate with the other modules 200 to control the entire drill string 102 as a system taking into account sensor readings, control instructions, etc., at different sections of the drill string 102. For example, a BHA 104 may include multiple different downhole tools, such as a drill bit, a reamer, a stabilizer, a steering mechanism, a gamma sensor assembly, a direction measuring device, a motor, etc. Efficient control of the drill string 102 may require coordination and communication between the different downhole tools. For example, sensors located near a drill bit may provide valuable information for control of other downhole tools such as a motor, a steering mechanism, etc. In some embodiments, the communication line between the separate modules 200 may also be monitored. For example, the entire BHA 104 may include a master module that monitors and/or controls communication between the modules 200 similar to the master node 202 (FIG. 2). In some embodiments, each module 200 may monitor the communication between the respective module 200 and the other modules 200 with or without a master module.

Monitoring communication may include monitoring communication requests (e.g., pings, token request, GET command, etc.). For example, whether a request is granted or denied by the respective node or module may be monitored. The receipt of a request may be monitored by determining whether a request is received or the receipt fails. The delivery of a request may also be monitored by determining whether a request is delivered or the delivery fails. In some embodiments, delivery and/or receipt of data (e.g., packets) may also be monitored.

The monitored communication may be stored as metadata in action 404. In some embodiments, the communication metadata may be stored in a memory storage device 308 at the module level. In some embodiments, the communication metadata may be stored at the node level. For example, the master node 202 may store the communication metadata in the respective memory device 208 of the master node 202 as described above. In some embodiments, each node may include a memory device 208 to store the respective communication metadata of each node. In some embodiments, a master module as described above may include a master memory storage device 308 that may store the communication metadata for all modules and/or nodes associated with the master module. In some embodiments, a computing device at the surface of a drilling operation may include a memory storage device 308 configured to store all communication metadata associated with the earth-boring tool system 300 or drill string 102.

The memory storage device 308 may range from a semiconductor device or integrated circuit in a circuit board (e.g., chip, card, microprocessor, etc.) to a separate hard drive (e.g., disk drive, solid state drive, etc.). For example, some slave nodes 206 may be a circuit board coupled to a sensor that includes a memory device 208 coupled to or integrated into the circuit board. In some embodiments, the memory storage device 308 may be a hard drive that is assembled as part of a rack of computers such as a server rack controlling an entire drilling operation with multiple wells. In some embodiments, the communication metadata may be stored in multiple locations, such as at the node level and at a system level. For example, the communication metadata may be stored at the node level continuously and the node level communication metadata may be transferred to a system level memory storage device 308 at predefined intervals. In some embodiments, the metadata can be stored on the surface or at a remote location via wire, wireless or satellite connection.

The communication metadata may be processed by a processor in action 406. Processing the communication metadata may include establishing relationships between nodes and building models from the communication metadata for each node and mission successes/failures. For example, the processor may generate receipt ratios of successful receipts to failed receipts, delivery ratios of successful deliveries to failed deliveries for each node and mission success and failures. For example, the processor may generate receipt ratios of successful receipts to no response receipts or receipt ratio of failure receipts to no response receipts. In some embodiments, the processor may generate rations of requests that are granted to requests that are denied. In some embodiments, the processor may arrange the communication metadata by time and/or identify time ranges when more failures or successes occurred. In some embodiments, the process may arrange the communication metadata by the time, ratio and respect relation between nodes (e.g., as a live network).

The memory storage device 308 may include historical communication metadata. The historical communication data (data or metadata) may include communication metadata collected from modules on previous drill strings along with failure statistics of the respective modules. The failure statistics may include whether the node associated with a specific set of historical communication metadata failed during the next drilling operation. The historical communication metadata may represent data sets from many previous drilling operations. As the number of data sets in the historical communication metadata increases an accuracy of the predictions may similarly increase.

The historical communication metadata may be used to build predictive models for each related pair of nodes in action 408. The processor may use the predictive models developed from the historical communication metadata to estimate a life expectancy of each node. The life expectancy of each node may be a prediction of whether the node will fail during the next drilling operation (e.g., before the drill string 102 is extracted the next time). The models may include a machine learning model, such as a neural network or classification approach. The model may compare the communication metadata for each node to the historical communication metadata and mission data. Some examples of machine learning models are taught in U.S. Pat. No. 8,417,495 to Dashevskiy filed on Nov. 6, 2008, and U.S. Pat. No. 9,857,271 to Dashevskiy filed on Oct. 10, 2013, the disclosure of each of which is hereby incorporated herein in their entirety by this reference.

A machine learning, neural network, classical regression, and/or deep learning may be used to build a predictive model. In some embodiment, linear discriminant approach may be used. Classification may divide historic data into two populations (or categories). A first set of assemblies may belong to successful runs (e.g., non-failures) and a second set may belong to failures. For example, the two sets may be designated $\varphi_1$ and $\varphi_2$. The respective probability density function (PDF) may be designated $f_1(x)$ and $f_2(x)$. The respective PDFs may be compared through a probability ratio illustrated by the following formula:

$$R(x) = \frac{f_1(x)}{f_2(x)}.$$

In some embodiments, a new assembly may be classified to have a successful mission if $R(x)>1$ and a potential to have an unsuccessful mission if $R(x)<1$. An assembly with probability ratio of 1 may be unclassifiable.

In some embodiments, a probability of misclassification may also be calculated. Misclassification of an assembly as failure may lead to higher maintenance cost. At the same time misclassification of an assembly as success may lead to failure during a mission. Failure during a mission may reduce tool reliability. A linear discriminant algorithm may be enhanced to reduce the probability of misclassification. An enhancement to the algorithm may be to build multiple validated models. Metadata from an assembly by tool and by nodes. Depending upon the number of tools and nodes, a certain number of linear discriminant models may be built. These discriminant models may be used to calculate probability ratios $R_1(x), R_2(x), \ldots, R_N(x)$. These ratios may be used to predict success or failure $d_1(x), d_2(x), \ldots, d_N(x)$ of the next run.

The processor 306 may compare the communication metadata to historical communication metadata that is stored in the memory storage device 308 by feeding the metadata into the predictive models in action 410. In some embodiments, the processor 306 may compare the raw communication metadata to the historical communication metadata by running the predictive models. In some embodiments, the processor 306 may compare the communication metadata to the historical communication metadata by running the predictive models.

The model may generate failure predictions for each node in action 412. The failure prediction may be a prediction of whether the node is likely to fail during the next drilling operation. In some embodiments, the model may generate separate failure predictions for each model resulting in a plurality of failure predictions for each node. For example, a first failure prediction may be generated based on the receipt ratio. A second failure prediction may be generated based on the delivery ratio. A third failure prediction may be generated based on the timing of the failures and successes. In some embodiments, additional models may be generated based on other aspects of the drilling system such as formation material, the type of tool, temperature data, speed data, torque data, pressure data, length of service, etc. Some models may be simplified models. For example, the length of service model may be a comparison of the length of service of each node to the average life expectancy of the node. In some embodiments, the length of service model may be more complex, such as a machine learning model accounting for the average life expectancy of a node used in a formation and/or tool having similar characteristics.

After one or more failure predictions are generated and aggregated the processor may generate a recommendation of whether or not to replace the node in action 414. When more than one failure prediction is generated for each node, the processor may account for variations between each failure prediction. For example, the aggregated recommendation may be based on the number of failure predictions that predict a failure (e.g., failure count) compared to the number of failure predictions that predict success (e.g., success count or non-failure count). In some embodiments, the recommendation may weigh some models heavier than other models. For example, once a node reaches its average life expectancy the probability that the node will not survive another drilling operation is high. Therefore, the recommendation may afford greater weight to the length of service model when it predicts a failure. In some embodiment, the recommendation may combine the network of predictions to using a probability/statistical approach.

In some embodiments, the recommendation may consider the communication metadata of neighboring nodes as well. For example, if all nodes in a module have a large number of communication failures the recommendation may be to replace the master node rather than all of the associated slave nodes. In another example, if several nodes in a specific location have a large number of failed communications, but one node that communicates with each of the several nodes has a significantly larger number of failed communications, the recommendation may recommend changing the one node attributing the large number of failed communications in the surrounding nodes to the one node.

In some embodiments, the aggregated recommendation may be to replace modules rather than individual nodes. For example, one or more models may account for a cost and/or availability analysis. In some embodiments, it may be less expensive and/or labor intensive to replace a module than to replace individual nodes. For example, a module may be an integrated device or bolt-on part that is easily replaced whereas replacing an individual node may require re-wiring a tool, removing a circuit board, un-soldering and re-soldering a circuit board, or other processes that may be time consuming and/or have the potential of damaging surrounding devices or nodes.

In some embodiments, the recommendation may account for events in making an aggregated recommendation. For example, the timing of the communication failures and successes may reveal that an event occurred that caused a large number of nodes to have a large number of communication failures over a specific time period. The recommendation may account for the event by reducing the weight of the receipt ratio and delivery ratio for each effected node. In some embodiments, the aggregated model may remove communication metadata over the specific time period from the analysis to account for the event. In some embodiments, the aggregated model may recommend in-depth analyses of metadata from all or some of the nodes.

Figure 5:
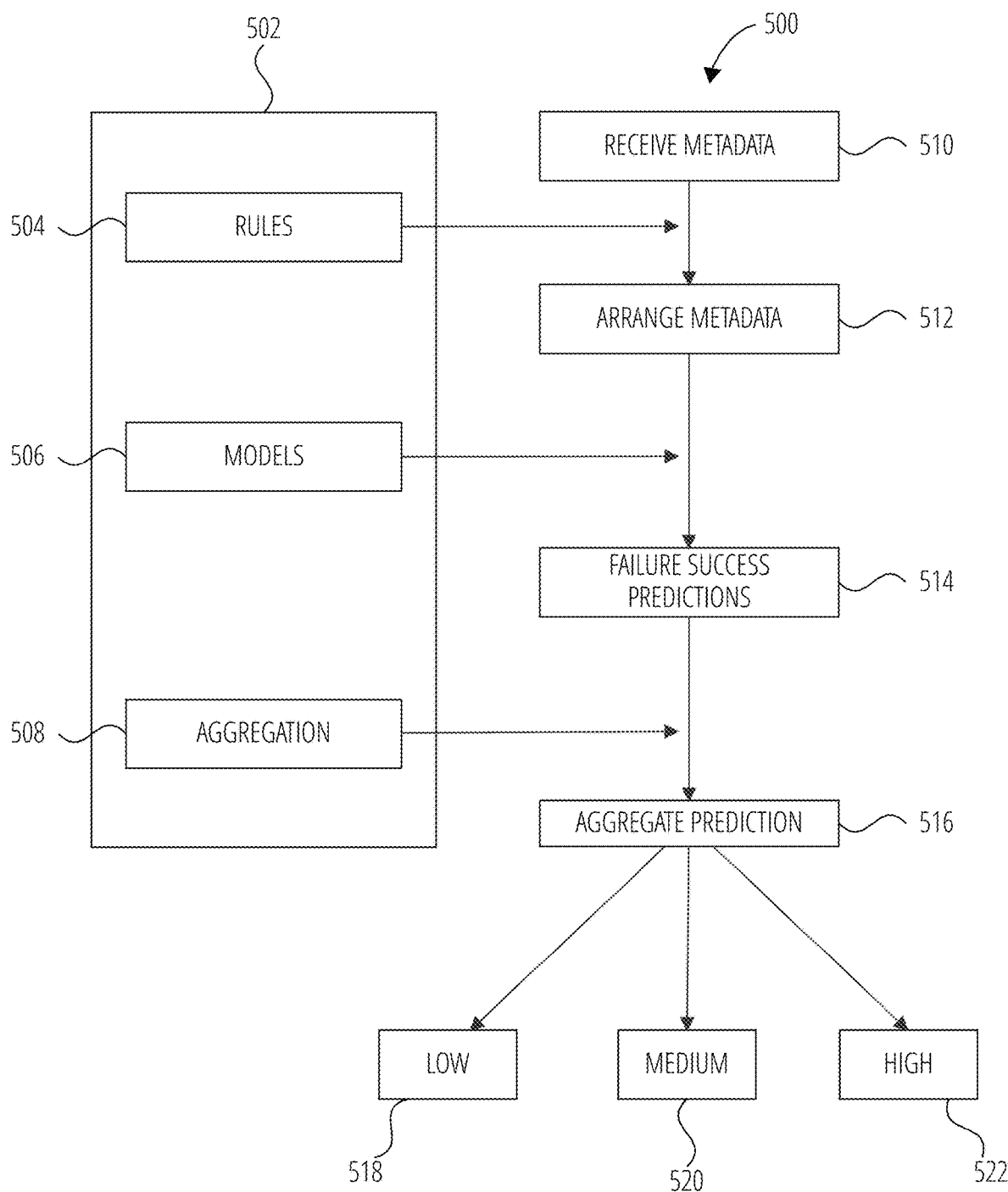
FIG. 5 illustrates a process diagram of an earth-boring tool system in accordance with an embodiment of the present disclosure.

FIG. 5 illustrates a diagram of an algorithm used in the earth-boring system 500 to predict a failure of a component of a drill string. The algorithm used in the earth-boring system 500 may access different forms of data 502. The data 502 may include rules 504, such as instructions for handling the communication metadata, instructions for establishing relationships within the communication metadata, building models, instructions for sorting the communication metadata, etc. The rules 504 may include instructions based on a tool layout or network layout. The data 502 may also include historical communication metadata. The data 502 may use the historical communication metadata to generate models 506 for comparing the communication metadata to the historical communication metadata. The data 502 may further include aggregation rules 508. The aggregation rules 508 may include instructions for providing recommendations for the nodes. The aggregation rules 508 may also include instructions for weighting the predictions provided by the models 506.

The earth-boring tool system 500 may be configured to perform several steps to provide a recommended course of action for each node in the earth-boring tool system 500. The earth-boring tool system 500 may receive communication metadata from each node in the collection step 510. The communication metadata may be arranged according to the rules 504 stored in the data 502 in the relationship step 512. For example, the rules 504 may sort the communication metadata by time stamp. In some embodiments, the rules 504 may generate a model between the data stored in the communication metadata such as receipt ratios and delivery ratios. In some embodiments, the rules 504 may separate portions of the communication metadata by formation properties in particular sections of the wellbore. For example, if a first section of the wellbore passed through a formation material that was substantially harder than the formation material in a second section of the wellbore, the rules 504 may cause the communication metadata collected during the first section of the wellbore to be separated from the communication metadata collected during the second section of the wellbore.

The earth-boring tool system 500 may then compare the arranged communication metadata to historical communication metadata through the models 506 from the data 502 in the prediction step 514. The models 506 may include simulations, machine learning models, mathematical calculations, filtering, self-learning, classification etc. The models 506 may account for the historical communication metadata through different methods depending on the model 506. For example, in machine learning models the neural network may be trained and/or validated using the historical communication metadata. The machine learning model may then identify the data sets that are closest to the arranged communication metadata. The machine learning model may then interpolate between the identified data sets to provide failure predictions for the each node based on its associated communication metadata. As described above, a model for determining the length of service may be a comparison of the length of service of each node to the average life expectancy of the node, where the average life expectancy of the node is calculated from the historical communication metadata. Other models 506 may use the historical communication metadata to determine other constants for use in mathematical calculations or simulations.

Each of the models 506 may provide a separate failure prediction for each separate communication link identified in the relationship step 512. The network of models representing tool structure may have prediction for each link in the network. Therefore, the earth-boring tool system 500 may generate multiple failure predictions for each node in the prediction step 514. Depending on the factors and respective weight given to each factor in each model may produce differing results for each node. The weighting is an example and can be replaced by another algorithm or aggregation approach. For example, one node may have two models 506 that predict that the node will fail in the next drilling operation, while four other models 506 predict that the node will survive the next drilling operation.

The earth-boring tool system 500 may use the aggregation rules 508 from the data 502 in the recommendation step 516 to combine the multiple failure predictions into a single recommendation. In some embodiments, the aggregation rules 508 may weigh some models heavier than other models. For example, once a node reaches its average life expectancy the probability that the node will not survive another drilling operation is high. Therefore, the aggregation rules 508 may afford greater weight to the length of service model when combining the multiple failure predictions.

In some embodiments, the aggregation rules 508 may consider the communication metadata of neighboring nodes as well. For example, if all nodes in a module have a large number of communication failures the aggregation rules 508 may attribute the failures to the master node rather than all of the associated slave nodes and weigh the associated models accordingly. In another example, if several nodes in a specific location have a large number of failed communications, but one node that communicates with each of the several nodes has a significantly larger number of failed communications, the aggregation rules 508 may recommend changing the one node attributing the large number of failed communications in the surrounding nodes to the one node and weigh the associated models accordingly.

In some embodiments, the aggregation rules 508 may account for a cost and/or availability of the particular nodes, modules, or associated drilling tools. For example, as described above, it may be less expensive and/or labor intensive to replace a module than to replace individual nodes.

The recommendation step 516 may produce a range of predictions. For example, the recommendation step 516 may produce a probability of failure as illustrated in FIG. 5. The recommendation step 516 may provide range such as a low probability of failure 518, a medium probability of failure 520, or a high probability of failure 522. In some embodiments, the recommendation step 516 may determine the range based on an average prediction of each model. For example, as illustrated in the following formula:

$$D(x) = \begin{cases} \text{Low} & \text{if} \quad \frac{1}{N}\sum_{i=1}^{N} d_i(x) \leq T_1 \\ \text{Medium} & \text{if} \quad T_1 > \frac{1}{N}\sum_{i=1}^{N} d_i(x) \leq T_2 \\ \text{High} & \text{otherwise} \end{cases}$$

In the above formula, $d_i(x)$ is representative of the failure prediction from each individual model, N is representative of the number of individual models. Thus, an aggregated failure prediction may be obtained by adding the individual failure predictions and dividing the total by the number of predictions. The aggregated failure prediction may then be compared against a first threshold $T_1$ and a second threshold $T_2$ to determine a probability of failure or a risk level. If the failure prediction is below the first threshold $T_1$ the recommendation step 516 may return a final failure prediction or recommendation D(x) of a low probability of failure 518 (e.g., low risk level). Alternatively, if the aggregated failure prediction is between the first threshold $T_1$ and the second threshold $T_2$, the recommendation step 516 may return a final failure prediction D(x) of a medium probability of failure 520 (e.g., medium risk level, moderate risk level, etc.). If the aggregated failure prediction is above the second threshold $T_2$, the recommendation step 516 may return a final failure prediction D(x) of a high probability of failure (e.g., high risk level).

In some embodiments, the first threshold $T_1$ may be between about 0% and about 30%, such as between about 10% and about 30%, or between about 10% and about 20%. The second threshold $T_2$ may be between about 30% and about 60%, such as between about 30% and about 50%, or between about 40% and about 50%. These ranges are just an example and the actual value may change based on the number of nodes, number of models and complexity of the BHA. For example, the thresholds may be dependent upon the BHA assembly and the individual module.

In some embodiments, the failure predictions $d_i(x)$ may be weighted. For example, some models may be afforded more weight, such as the length of service model discussed above, whereas other models may be afforded less weight, such as communication failures that are likely attributed to a downhole event (e.g., vibration, electromagnetic field, etc.). For example, the formula may be adjusted as follows:

$$D(x) = \begin{cases} \text{Low} & \text{if} \quad \frac{1}{N}\sum_{i=1}^{N} y_i * d_i(x) \leq T_1 \\ \text{Medium} & \text{if} \quad T_1 > \frac{1}{N}\sum_{i=1}^{N} y_i * d_i(x) \leq T_2 \\ \text{High} & \text{otherwise} \end{cases}$$

In the formula above, a multiplier $y_i$ may be applied to each individual failure prediction $d_i(x)$. Thus the average failure prediction may be a weighted average. The weighted average may then be compared against the thresholds $T_1$ and $T_2$. The recommendation step 516 may then return a final failure prediction D(x) as described above. In some embodiments, the aggregation approach may be replaced by classification approach or a Bayesien updating approach. In some embodiments, the aggregated recommendation may use a combination of averaging, weightage and other approaches.

In some embodiments, each model may be compared to the thresholds and provide an individual low, medium, or high probability of failure prediction. A final low probability of failure 518 may be generated when no models predict a high probability of failure during the next drilling operation or a minimal number of models, such as less than 3 predict a medium probability of failure. In some embodiments, the low probability of failure 518 may be provided even if more than 3 models predict a medium probability of failure but the models predicting failure are afforded little weight compared to the models that predict successful completion of the next drilling operation. In some embodiments, a high probability of failure 522 may be produced even when only one or two models predict failure if the one or two that predicted failure are afforded greater weight such as the length of service model discussed above. The medium probability of failure 520 may be provided when there is not a substantial difference between the models that predict failure and the models that predict success. For example, the medium probability of failure 520 may be provided when a weighted ratio of the models that predict failure to the models that predict success is between about ⅕ and about ⅘, such as between about 3/10 and about 7/10, or between about 7/20 and about 13/20.

The earth-boring tool system 500 may complete this process for each node in the earth-boring tool system 500. The resulting recommendations may be provided to the operator through a user interface. For example, the results may be displayed to the operator through a graphical user interface (GUI) on a computer, tablet, or other display. In some embodiments, the recommendations may be provided to the operator through a print out. In other embodiments, the recommendations may be provided to the operator through lights or colors on a display or panel.

Figure 6:
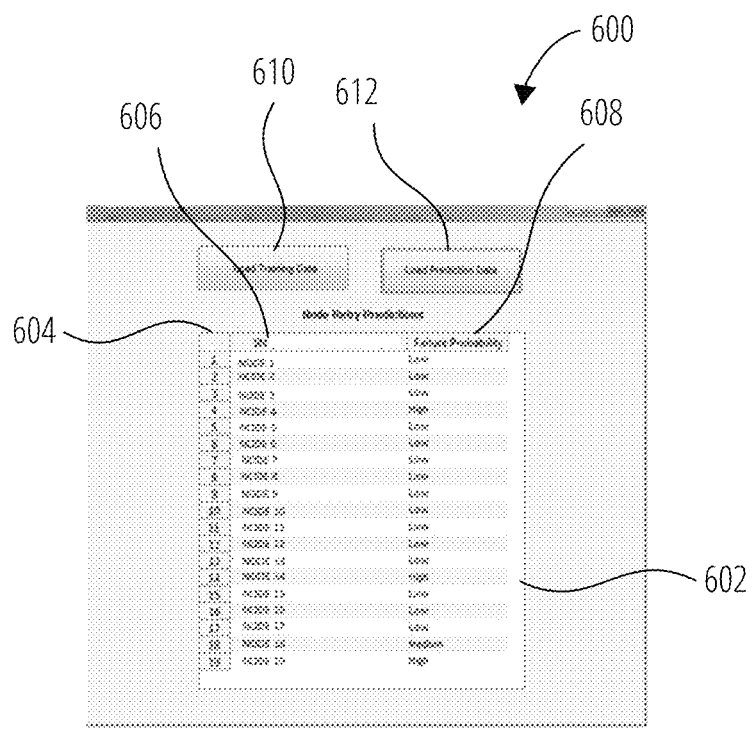
FIG. 6 illustrates a user interface in accordance with an embodiment of the present disclosure.

FIG. 6 illustrates a GUI 600 that may be used with the earth-boring tool system 500 discussed above to provide a recommendation for each node. The GUI 600 may include a table 602 that displays the results of the process described in FIG. 5 above. The table 602 may include a number column 604 that sequentially numbers each node in the earth-boring tool system 500. The table 602 may also include a node name column 606 where custom names may be assigned to each node. For example, the nodes may be named by location, function, etc. In some embodiments, the nodes may have codes or other custom naming conventions developed by the operator, manufacturer, engineer, etc., associated with the drilling operation. The table 602 may also include a recommendation column 608 that displays the recommendation (e.g., low probability of failure 518, medium probability of failure 520, and high probability of failure 522) from the process described in FIG. 5.

The GUI 600 may also provide the operator with command buttons to control when data is input and how the data is input. For example, the GUI 600 may include a historical data input 610 that may be used when loading a database of historical communication metadata. In some embodiments, the process discussed in FIG. 5 may be done after the drill string has been extracted from the well bore. Therefore, nodes that have failed may be coupled to the previously stored communication metadata for the failed nodes and input into the data 502 and nodes that survived may be coupled to the previously stored communication metadata for the successful nodes and input into the data 502 to further train the models 506. The operator may use the historical data input 610 to input the additional data into the data 502.

The 600 may also provide the operator with a current data input 612. The current data input 612 may be used to input the communication metadata collected in the collection step 510. In some embodiments, the collection step 510 may be a continuous process being performed by the individual nodes and the current data input 612 may start the model building step 512. In some embodiments, the collection step 510 may be separated into more than one step. For example, the individual nodes may be continuously collecting communication metadata and the current data input 612 may cause a master storage device or the data 502 to collect the communication metadata from each node so that the communication metadata may be processed in a single location.

In some embodiments, the process discussed above in FIG. 5 may occur during a drilling operation (e.g., while the BHA is downhole). For example, the recommendations may be used to determine if a drill string should be extracted (e.g., tripped out) to replace a critical module. The operator may use the current data input 612 to run the process manually. For example, the operator may run the process when irregularities in the electronics or communication are discovered. The recommendations may enable the operator to troubleshoot the earth-boring tool system without tripping the drill string out of the wellbore. In some embodiments, the process may be run at regular intervals, such as for preventative maintenance of the drill string.

Embodiments of the present disclosure may provide a system and method for evaluating the health of electronic devices on an earth-boring tool. Determining the health of the electronic devices may enable an operator to change an electronic device or portion of the electronic device before the device fails. Replacing the devices before they fail may reduce the number of times a drill string is tripped out of a wellbore. Tripping a drill string out of a well bore may result in a loss of multiple days in a drilling operation. The loss of multiple days can cost a large amount of money for operations that are operating at millions of dollars a day. The loss of multiple days may also delay the time before a well begins production and becomes profitable.

Embodiments of the present disclosure may also enable operators to troubleshoot an earth-boring tool while the earth-boring tool remains downhole to determine what if any parts have failed and if the failed part will require tripping the drill string out of the wellbore. This may also reduce the number of times a drill string is tripped out by enabling the operator to distinguish critical component failures from minor failures.

The embodiments of the disclosure described above and illustrated in the accompanying drawing figures do not limit the scope of the invention, since these embodiments are merely examples of embodiments of the invention, which is defined by the appended claims and their legal equivalents. Any equivalent embodiments are intended to be within the scope of this disclosure. Indeed, various modifications of the present disclosure, in addition to those shown and described herein, such as alternative useful combinations of the elements described, may become apparent to those skilled in the art from the description. Such modifications and embodiments are also intended to fall within the scope of the appended claims and their legal equivalents.

What is claimed is:

1. A method of predicting a failure in an earth-boring tool, the method comprising:
monitoring communication between at least two nodes in the earth-boring tool providing metadata from the communication, wherein the metadata comprises data indicating communication quality, the monitoring being performed by a processor, the processor connected to the at least two nodes, wherein the at least two nodes are part of a communication system including at least one downhole module;
generating, using the processor, one or more models from historical communication metadata, the one or more models and the historical communication metadata stored in a memory device;
training the one or more models using the historical communication metadata; and
determining, using the processor, a failure prediction for at least one of the at least two nodes by comparing the metadata from the communication monitored by the processor with the historical communication metadata using the one or more trained models.

2. The method of claim 1, wherein:
the data indicating communication quality comprises at least one of data indicating a successful communication receipt, data indicating a failed communication receipt, data indicating a successful communication delivery, and data indicating a failed communication delivery; and
generating the one or more models comprises generating a receipt ratio using at least one of the successful communication receipt and the failed communication receipt, or a delivery ratio using at least one of the successful communication delivery and the failed communication delivery.

3. The method of claim 1, wherein each of the one or more models are configured to predict a failure for at least one of the at least two nodes.

4. The method of claim 1, wherein at least one of the one or more models comprises a machine learning model.

5. The method of claim 1, further comprising generating a plurality of failure predictions for at least one of the at least two nodes.

6. The method of claim 5, further comprising:
identifying a non-failure count of the plurality of failure predictions for at least one of the at least two nodes; and
identifying a failure count of the plurality of failure predictions for at least one of the at least two nodes.

7. The method of claim 1, wherein the historical communication metadata comprises failure statistics for a previous node on at least two previous drill strings.

8. The method of claim 7, wherein the historical communication metadata further comprises at least one of a formation property and a tool property associated with the historical communication metadata and the failure statistics for the previous node on the at least two previous drill strings.

9. The method of claim 1, further comprising generating at least two models from the historical communication metadata, each model providing a failure prediction for at least one of the at least two nodes.

10. The method of claim 9, further comprising applying different weights to the failure predictions provided by the at least two models.

11. The method of claim 9, further comprising combining the failure predictions provided by the at least two models to generate a recommendation of replacing or re-running at least a component of the earth-boring tool.

12. A non-transitory computer-readable storage medium, the non-transitory computer-readable storage medium including instructions that when executed by a processor, cause the processor to:
- receive communication metadata from one or more nodes of an earth-boring tool, the one or more nodes being part of a communication system including at least one downhole module, wherein the communication metadata comprises data indicating communication quality;
- generate one or more models from historical communication metadata;
- store the one or more models in a memory device; and
- generate a failure prediction for at least one of the one or more nodes of the earth-boring tool by comparing the communication metadata with the historical communication metadata using the one or more models.

13. The non-transitory computer-readable storage medium of claim 12, wherein the historical communication metadata comprises failure statistics for a previous node on at least two previous drill strings.

14. The non-transitory computer-readable storage medium of claim 13, wherein the historical communication metadata further comprises a formation property associated with the historical communication metadata and the failure statistics for the previous node on the at least two previous drill strings.

15. The non-transitory computer-readable storage medium of claim 13, wherein the historical communication metadata further comprises a tool property associated with the historical communication metadata and the failure statistics for the previous node on the at least two previous drill strings.

16. The non-transitory computer-readable storage medium of claim 12, wherein the instructions cause the processor to generate at least two models configured to compare the communication metadata to the historical communication metadata.

17. A system for generating a health estimate of an earth-boring tool comprising:
- a drill string comprising at least one earth-boring tool;
- the earth-boring tool comprising at least one electronic device comprising at least two nodes, and a communication line,
- a health estimation system comprising:
  - a processor; and
  - at least one non-transitory computer-readable storage medium storing instructions thereon, the instructions including historical communication metadata; when executed by the processor, the instructions cause the health estimation system to:
    - monitor communication metadata from the communication line; wherein the communication metadata comprises data indicating communication quality between the at least two nodes;
    - generate a model from the historical communication metadata; and
    - generate a failure prediction for the at least one electronic device by comparing the communication metadata to the model.

18. The system of claim 17, wherein at least one of the at least two nodes comprises a master node.

19. The system of claim 18, wherein at least one of the at least two nodes comprises a slave node.

20. The system of claim 17, wherein the model is a machine learning model.

* * * * *